United States Patent Office 2,814,212
Patented Nov. 26, 1957

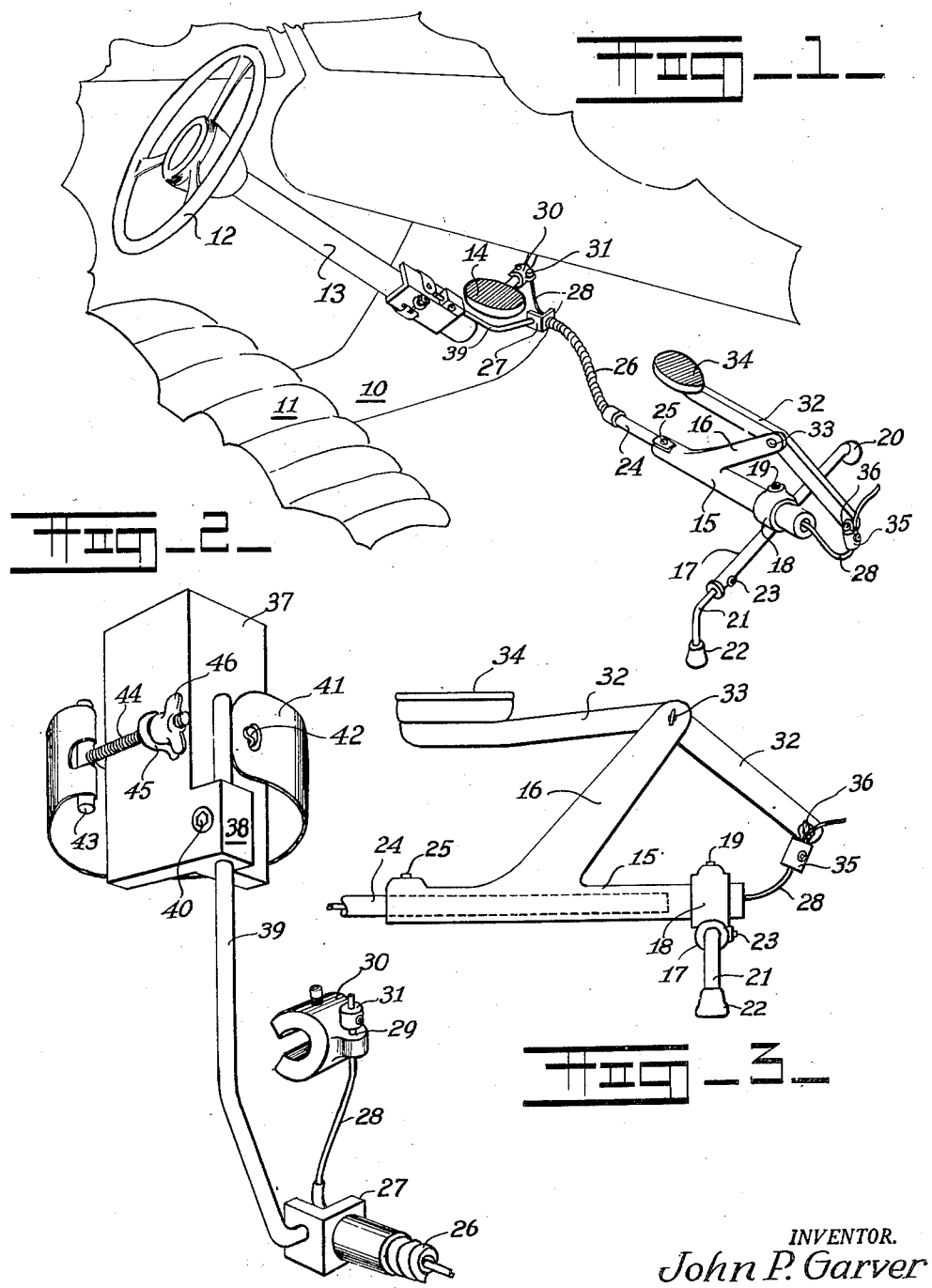

2,814,212

DUAL CONTROL DEVICE FOR AUTOMOBILES

John P. Garver, Poland, Ohio

Application June 7, 1955, Serial No. 513,753

3 Claims. (Cl. 74—562.5)

This invention relates to automobiles in general and in particular to a dual control device that may be temporarily installed in an automobile to provide dual control of the braking system of the automobile.

The principal object of the invention is the provision of a simple and inexpensive dual control device for an automobile brake pedal.

A further object of the invention is the provision of a dual control device which may be adjusted in several dimensions to accommodate itself to various automobiles.

A still further object of the invention is the provision of a dual control device which will enable positive motion to be applied to a brake pedal in an automobile from a point remote to the brake pedal of an automobile without interfering with the normal use of the brake pedal by the driver of the automobile.

A still further object of the invention is the provision of a dual control brake pedal actuator for an automobile which may be easily attached to an automobile and conveniently removed therefrom.

The dual control device for actuating the brake pedal of an automobile from a remote point as disclosed herein comprises an improvement in the art in that an adjustable flexible mechanism is disclosed which may be operatively attached to any brake pedal of any automobile and used to actuate the same from a remote position with respect thereto as by a person instructing the driver of the automobile.

It has heretofore been common in the art to attach a sideward extension to the brake pedal of an automobile to enable an instructor to move the brake pedal from a position adjacent thereto. Such devices are objectionable for the reason that they interfere with the ordinary operation of the brake pedal by the driver and at the same time they bend the brake pedal or cause it to bind on its bearings by acting as levers tending to tilt the pedal rather than depress it. Such devices must be bolted to the pedals and therefore damage the same, and at the same time they severely limit the range of operativeness due to the usual increase in floor height in the front compartment of an automobile immediately to the right of the brake pedal as provided to accommodate the transmission and other portions of the automobile structure.

The present invention completely eliminates these several difficulties as it may be quickly and easily attached to any automobile, adjusted to match the particular floor shape of the driver's compartment and in no way interferes with the free use of the pedal and in no way limits the normal travel of the pedal.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the function and scope of the invention.

The invention is illustrated in the accompanying drawing, wherein:

Figure 1 is a perspective elevation of a portion of the driver's compartment of an automobile showing the dual control device installed therein.

Figure 2 is an enlarged detail in perspective illustrating a portion of the dual control device illustrated in Figure 1.

Figure 3 is an enlarged side elevation of another portion of the dual control device illustrated in Figure 1 of the drawings.

By referring to the drawings and Figure 1 in particular, it will be seen that a portion of an automobile has been illustrated including a floor 10 in the driver's compartment thereof, a seat 11, a steering wheel 12, a steering column 13 and a brake pedal 14.

The dual control comprises a tubular body member 15 having an upstanding angularly disposed bifurcated arm 16 on its upper surface and a transversely disposed tubular leg assembly 17 clamped thereto adjacent one end.

The tubular leg assembly 17 includes an annular bracket 18 having a set screw 19 which is engaged against the tubular body member 15 when the annular bracket 18 is properly located with respect thereto. One end of the tubular leg assembly has a rubber cap 20 positioned directly thereon and the other end telescopically receives an angular secondary leg 21 which in turn has a rubber cap 22 on the outer end thereof.

A set screw 23 engaged in a threaded orifice in the tubular leg assembly 17 enables the angular secondary leg 21 to be secured in fixed relation in the leg assembly.

As illustrated in Figure 1 of the drawings the rubber cap 20 on one end of the tubular leg assembly 17 is positioned on the upwardly inclined portion of the floor 10 of the driver's compartment of the automobile in the area normally occupied by the feet of a passenger riding beside the driver while the angular secondary leg 21 is positioned against the level floor directly in front of the passenger's side of the seat 11. The tubular body member 15 lies along the angle in the floor 10 where it changes from a flat surface, as in front of the seat 11, and runs upwardly on an incline as toward the front wall of the driver's compartment.

The tubular body member 15 has a telescopically positioned longitudinal tubular extension 24 in one end thereof opposite to the end about which the annular bracket 18 is secured, the set screw 25 in the tubular body member 15 serving to secure the tubular extension 24 at the desired length of extension.

A flexible tube 26 is attached to the end of the tubular extension 24 and extends up and over the raised portion of the floor 10 usually found in an autombile and in the center of the driver's compartment and terminates in an L-shaped bracket 27 which is apertured so that a flexible control cable 28 positioned in the tubular body member 15 and through the tubular extensions 24 and 26 will be movable into and out of the end of the flexible tube 26 as held by the L-shaped bracket 27.

The end of the flexible control cable 28 is positioned through an opening 29 in a C-clamp 30, as best shown in Figure 2 of the drawings, and an end fitting 31 is secured to the flexible control cable 28 immediately thereabove.

The C-clamp 30 is attached to the arm supporting the brake pedal 14, and in the case of a dependent brake pedal, as in Figure 1 of the drawings, the C-clamp 30 may be located at any desired position along the arms supporting the pedal.

In the case of a pedal supported on an arm extending upwardly through an opening in the floor 10 (not shown) the C-clamp is positioned closely in under the pedal 14.

In either installation, movement of the flexible control cable 28 to the right through the flexible tube 26, tubular extension 24 and the tubular body member 15 will move the brake pedal 14 downwardly and apply the brakes.

Means for moving the flexible control cable 28 comprises a lever 32 pivoted by a pin 33 to the bifurcated arm 16 on the tubular body member 15, the lever 32 having a pedal 34 on one end and an opening in its opposite end, in which opening a secondary end fitting 35 is pivotally secured by means of a pin 36. The secondary end fitting 35 is secured to the flexible control cable 28.

It will thus be seen that downward movement imparted to the pedal 34 on the lever 32 will move the secondary end fitting 35 upwardly and outwardly on an arc, one end of which lies adjacent an end of the tubular body member 15 through which the flexible control cable 28 extends, as best illustrated in Figure 3 of the drawings.

It will occur to those skilled in the art that it is necessary to hold the L-shaped bracket 27 in stationary relation to the floor 10 of the automobile in order that the motion of the flexible control cable 28 will move the brake pedal 14 and its supporting arm downwardly. A clamp is secured to the steering column 13 for this purpose, the clamp comprising an elongated section of an angle shape 37 with a longitudinally apertured offset 38 in which an arm 39 is adjustably positioned by means of a set screw 40. The opposite end of the arm is secured to the L-shaped bracket 27, heretofore referred to, and the arm 39 is bent so that the L-shaped bracket 27 may be located directly beneath the brake pedal 14.

The section of angle shape 37 is clamped to the steering column 13 by a band 41 apertured at one end and hooked over a lug 42 on the angle shape 37. The band 41 is adapted to encircle the steering column 13 and is provided at its opposite end with a cross piece 43 having a threaded extension 44 positioned through an eyelet 45 on the side of the angle shape 37 with a butterfly nut 46 engaged on the threaded extension 44 to tighten the band 41 about the steering column 13, as best seen in Figure 2 of the drawings.

It will thus be seen that the dual control device for actuating the brake pedal of an automobile is attached to the automobile at only two places comprising the C-clamp 30 connection to the brake pedal 14 and the angle shape 37 engaged on the steering column. Since both of these clamping devices are simple in construction and operation, it takes only a short time to install or remove the device. While it is installed, it functions efficiently in providing a remote control of the brake pedal 14 while at the same time permitting the free motion of the brake pedal 14 when used by the driver.

It will be observed that the free motion of the brake pedal 14 is insured by the use of the flexible control cable 28 and the further provision of extending the flexible control cable 28 through the opening 29 in the C-clamp 30 which permits the C-clamp 30 to move longitudinally of the flexible control cable 28 downwardly and away from the end fitting 31 while at the same time enabling the flexible control cable 28 to move the C-clamp 30 when the flexible control cable 28 itself is moved downwardly.

It will also be seen that the device is so formed that it may be adjusted to over-all length and width and position at the time of installation by a few simple adjustments requiring only the loosening and tightening of the set screws 19, 23 and 25 and the set screw in the secondary end fitting 35.

It will thus been seen that the several objects of the invention are met by the dual control device for actuating the brake pedal of an automobile disclosed herein.

Having thus described my invention, what I claim is:

1. A remote control device for the brake pedal of an automobile comprising an elongated hollow body member having an upstanding portion, a lever pivotally secured to said upstanding portion, a clamp for engagement on the steering column of an automobile, an arm adjustably secured to said clamp in depending relation thereto, an apertured bracket on said arm, said apertured bracket held by said clamp and arm beneath said brake pedal of the automobile in a position toward which said pedal moves when depressed, a tubular extension of said body member engaged on said bracket, a flexible cable secured at one end to said brake pedal and extending through said body member and tubular extension thereof and said apertured bracket and attached to said lever, and a secondary pedal on said lever for moving the same, the flexible cable and brake pedal.

2. The remote control device set forth in claim 1 and wherein an arm assembly is adjustably secured to said body member transversely thereof.

3. A remote control device for the brake pedal of an automobile comprising an elongated hollow body member, a leg secured thereto transversely thereof, a leg extension telescopically engaged in said leg member and extending outwardly therefrom, an upstanding bifurcated arm on said body member, a lever secured to said bifurcated arm, a tubular extension having one end engaged in said hollow body member and an apertured bracket secured to the other end of said tubular extension, a clamp for engagement on the steering column of said automobile, said clamp comprising an elongated angular section having a band adjustably secured thereto for engagement around said steering column, a longitudinally apertured offset portion on said angular section of said clamp, an arm having one end adjustably positioned in said longitudinally apertured offset portion, the other end of said arm secured to said apertured bracket, said clamp and arm acting to position said apertured bracket beneath said brake pedal of the automobile in a position toward which said pedal moves when depressed, and a flexible cable secured at one end to said brake pedal and extending through said apertured bracket, tubular extension and said hollow body member and attached to said lever, and a secondary pedal on said lever for moving the same, the flexible cable and the brake pedal.

References Cited in the file of this patent

UNITED STATES PATENTS

| 2,202,585 | Jordan | May 28, 1940 |
| 2,649,814 | Brazell | Aug. 25, 1953 |
| 2,658,409 | Hughes | Nov. 10, 1953 |
| 2,710,547 | Davenport | June 14, 1955 |